Aug. 30, 1960  H. O. SHORT  2,950,626
COMBINATION PORTABLE ELECTRIC DRILL AND SCREWDRIVER
Filed Nov. 25, 1958  2 Sheets-Sheet 1
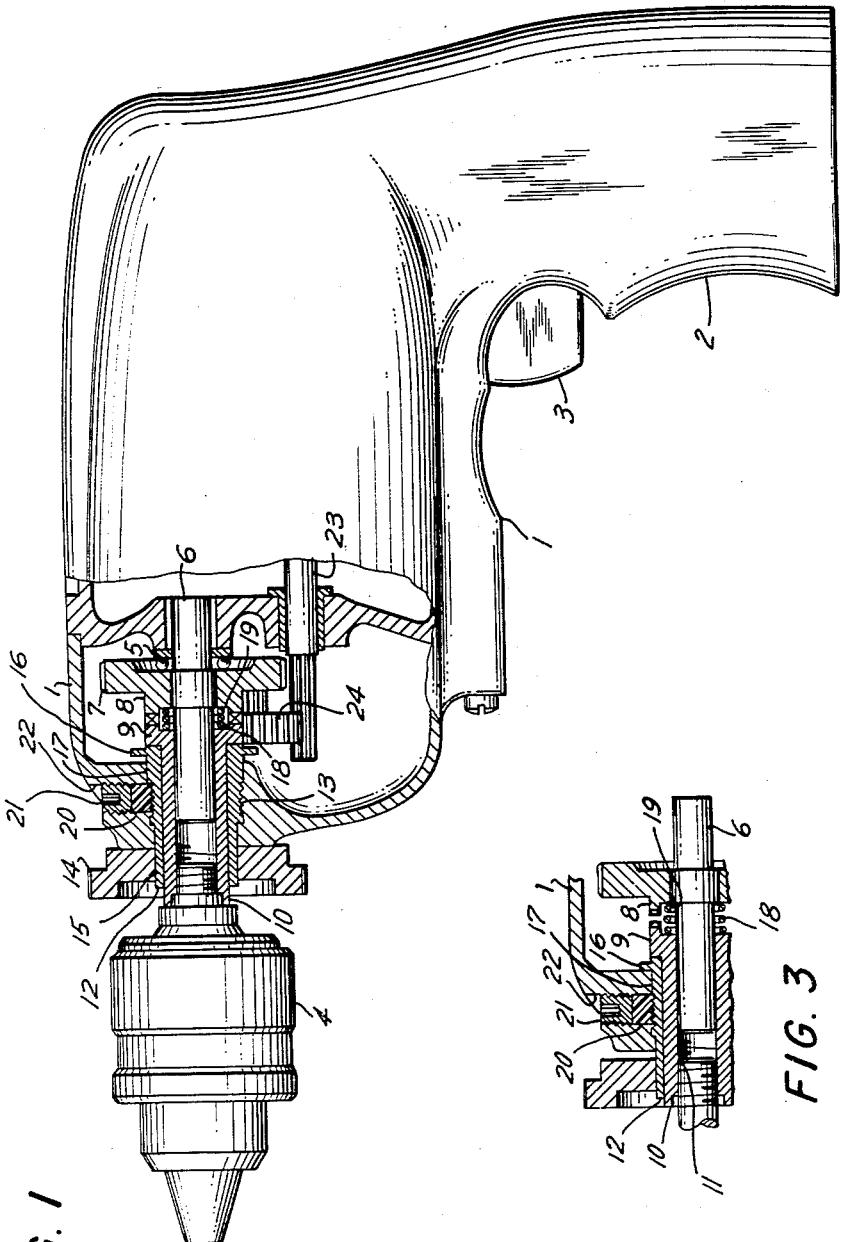
INVENTOR.
HAROLD O. SHORT
BY
*Leonard Bloom*
ATTORNEY

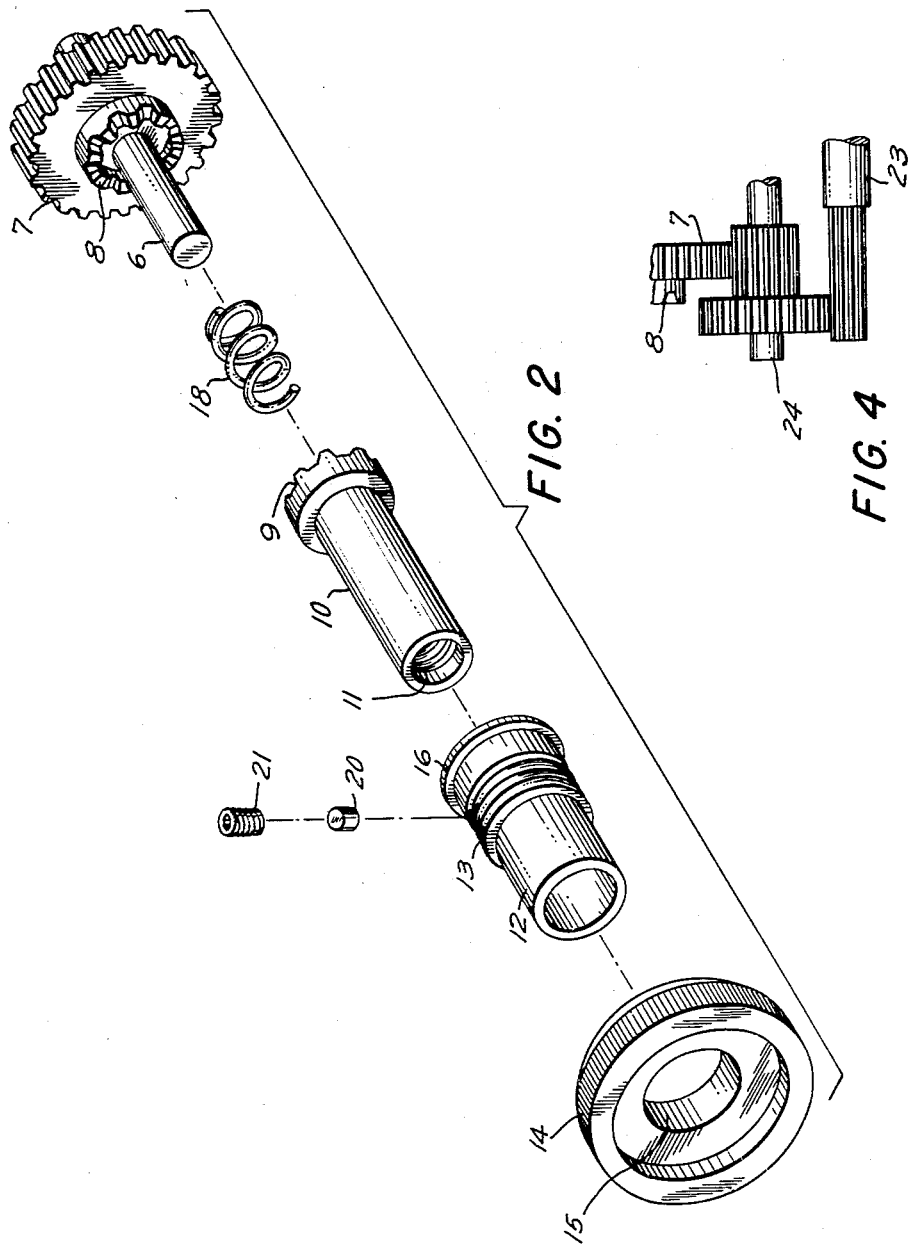

United States Patent Office 2,950,626
Patented Aug. 30, 1960

2,950,626

COMBINATION PORTABLE ELECTRIC DRILL AND SCREWDRIVER

Harold O. Short, Towson, Md., assignor to The Black and Decker Manufacturing Company, Towson, Md., a corporation of Maryland Filed Nov. 25, 1958, Ser. No. 776,268

9 Claims. (Cl. 74—333)

The present invention relates to a portable electric tool that combines the features of a drill and a screwdriver in an efficient and compact unit that is easy to operate and adjust.

It is an object of the present invention to provide novel manually-manipulated switching means to alternately and selectively shift to either the drill or the screw position.

It is another object of the present invention to provide damping and vibration isolation means to prevent unwanted slippage or abrupt shifting of the switching means.

It is still another object of the present invention to provide novel drive-engaging means that eliminates the necessity of complicated clutches and cumbersome mechanisms.

It is still a further object of the present invention to allow the same tool-bit chuck to be used for both drilling or screwdriving operations.

In accordance with the teachings of the present invention, a combination drill and screwdriver is provided having a housing, a driving clutch, a driven clutch, and a clutch spring normally maintaining said clutches in close engagement. The tension of the clutch spring must be overcome to drive the bit-holding mechanism, either manually in the use of the tool as a screwdriver, or mechanically in the use of the tool as a drill. A spindle bearing comprising a coaxial sleeve is rotatably mounted upon a spindle sleeve, and the spindle bearing has a rear portion that seats against an under surface of the driven clutch. The opposite end of the spindle bearing has an adjusting collar pressed thereon. The adjusting collar protrudes externally from the tool housing and is adapted to be rotated approximately 180° alternately in a clockwise or counter-clockwise direction. A portion of the outer cylindrical surface of the spindle bearing is threaded to engage corresponding inner threads formed within a bore in the tool housing. As the adjusting collar is so rotated as to move the spindle bearing rearwardly into the tool casing, the clutch spring tension is overcome; and the clutch is engaged. The tool is then positioned for a drilling operation. Should a screwdriving or like operation then be desired, rotation of the adjusting collar in the opposite direction forces the spindle bearing forwardly out of the tool housing until a rear collar on the spindle bearing shoulders or abuts against an inner wall portion of the tool housing. The clutch is then disengaged, and the tension of the clutch spring holds the faces of the clutch apart. The tool is then positioned for a screwdriving or nut-running operation. The same tool bit chuck is employed for either drilling or screwdriving; only the bit itself need be changed. The operator then engages the screwdriving bit on the work and manually pushes or presses against the tool so as to overcome the tension of the clutch spring, engage the clutch surfaces, and drive the work. At the desired instant, release of the operator's pressure against the tool will allow the clutch spring to disengage the clutch and stop the tool bit from driving the work in a manner well-known in the art. Should a subsequent drilling operation be desired, rotation of the adjusting collar in the reverse direction will cause the spindle bearing to move rearwardly into the tool casing, overcoming the tension of the clutch spring, and causing the clutch surfaces to be engaged.

Other objects of the present invention will become apparent from the following specification taken in conjunction with the enclosed drawings, in which:

Figure 1 is a side elevational view of the entire tool with part of the housing broken away to show the mechanism of the present invention, partially in full and partially in longitudinal section, with the clutches in locking engagement and the mechanism thus in position for a drilling operation;

Figure 2 is an enlarged exploded view of the mechanism of the present invention;

Figure 3 is a view of the mechanism, partially in full and partially in longitudinal section, corresponding to that as shown in Figure 1, but showing the clutches out of locking engagement and the mechanism thus in position for a screwdriving operation; and Figure 4 is a plan layout of the intermediate gear train for coupling the armature shaft to the spindle gear.

With reference to Figure 1, the motor housing 1, pistol grip 2, switch 3, and tool-bit chuck 4 are shown in outline form, while the combination switching and drive-engaging mechanism of the present invention are shown in cross-sectional view within the cut-away portion of motor housing 1. A thrust bearing 5 supports a spindle 6 on which spindle gear 7 and upper clutch 8 are pressed thereon or otherwise suitably secured. A detail view of the spindle gear 7 and upper clutch 8 is included in the exploded view of Figure 2, which shows upper clutch 8 as integrally formed on the forward face of spindle gear 7. The teeth of upper clutch 8 are so fashioned as to mesh with the corresponding teeth of lower clutch 9, with is integrally-fashioned on the rearmost portion of a spindle sleeve 10. A detail view of the spindle sleeve 10 and lower clutch 9 is likewise included in the exploded view of Figure 2. Spindle sleeve 10 and integral lower clutch 9 are rotatably and slidably mounted on spindle 6, and the inner circumference 11 of spindle sleeve 10 is threaded to engage a suitable tool-bit chuck 4. Rotatably and slidably mounted upon spindle sleeve 10 is a coaxial spindle bearing 12, which has a portion of its outer cylindrical surface threaded at 13 to engage a corresponding inner thread formed within an axial bore in housing 1 as shown in Figures 1 and 2. A coaxial adjusting collar 14 (see Figures 1 and 2) protrudes externally from housing 1 and is adapted for rotation approximately 180° in alternate clockwise and counter-clockwise directions. The inner circumference 15 of adjusting collar 14 is pressed onto or otherwise suitably secured to the forward extremity of spindle bearing 12 so as to be able to move spindle bearing 12 laterally in and out of housing 1 by a slight amount. As the adjusting collar 14 is rotated approximately 180° from the position shown in Figure 1, spindle bearing 12 will advance forwardly along the axis of the tool until integral collar 16 abuts against interior wall portion 17 of housing 1 as is illustrated in Figure 3. A clutch spring 18 is positioned around spindle 6 in an annular recess 19 between the upper clutch 8 and lower clutch 9 as is illustrated in Figures 1 and 2. As spindle bearing 12 advances forwardly with respect to housing 1, the tension of clutch spring 18 will be released to force spindle sleeve 10 to advance forwardly along with spindle bearing 12, and thus, upper clutch 8 will become disengaged from lower clutch 9.

The tool is now in the position for screwdriving, nut-running, and the like, as is illustrated in Figure 3. Once the proper tool bit has engaged the work, manual pressure is necessary on the part of the operator to overcome the tension of clutch spring 18 and cause upper clutch 8 to engage lower clutch 9 in a manner well-known in the art. Likewise, release of the operator's pressure on the tool will cause the clutch to be disengaged and will stop the tool bit from revolving, thus stopping the driving of the work.

Should a subsequent drilling operation be desired, the operator merely rotates adjusting collar 14 approximately 180° or one-half turn in the opposite direction, which causes spindle bearing 12 to move rearwardly into housing 1. The tension of clutch spring 18 is overcome, and lower clutch 9 is forced to engage upper clutch 8. Power transmitted to spindle 6, spindle gear 7, and upper clutch 8 will then cause lower clutch 9, spindle sleeve 10, and ultimately, tool bit chuck 4, to revolve directly as is desired in a drilling operation. The same tool bit chuck 4 may be employed for drilling as well as screwdriving operations, and only the bit itself need be changed.

It is seen that the present invention fulfills a need for an efficient, compact, combination portable electric drill and screwdriver that is easy to adjust and operate and eliminates the necessity of complicated clutches and cumbersome mechanisms.

As a supplementary feature on the present invention, means are provided to prevent unwanted slippage or abrupt shifting from the screwdriving to the drilling position, or vice-versa, during operation of tool. As shown in Figures 1 and 2, a nylon plug 20 is forced into a portion of the outer threads 13 of spindle bearing 12 by a set screw 21 that engages a threaded recess 22 in housing 1. Only one such nylon plug 20, set screw 21, and threaded recess 22 are illustrated in Figures 1 and 2, but two are recommended for greater rigidity. As shown in Figure 1, the threaded recess 22 comprises an auxiliary bore that is radially disposed with respect to the axis of spindle bearing 12 and lies in a plane which encompasses threads 13. The nylon plug 20 has an inherent vibration damping and isolation quality to prevent unwanted slippage or an abrupt movement of the spindle bearing 12 during operation of the tool. Other resilient or vibration damping material could be used equally as well for the plug 20, or other types of damping or isolation methods could be devised; and it is not to be construed that the scope of the present invention is to be limited to the specific means illustrated.

Any suitable means, such as armature shaft 23 and intermediate gear train 24 (shown diagrammatically in Figure 4), may be employed to drive spindle 6, spindle gear 7, and upper clutch 8. However, it is to be understood that the essence of the present invention is independent of the particular driving means employed; consequently, the scope of the present invention is not to be limited thereby.

Moreover, it is apparent that slight modifications and improvements could be effected without departing from the basic spirit of the present invention; therefore, it is to be understood that within the scope of the appended claims the invention could be practiced other than as specifically described.

I claim:

1. In a combination power-driven tool having a housing, a driving clutch, a driven clutch, and resilient means tending to maintain said clutches in disengagement, that improvement in being able at selected times to mechanically lock said clutches into operative engagement against the force of said resilient means, comprising, an axially-movable cylindrical member seated within a bore in said housing and having at least a portion of its external surface provided with a thread to engage a corresponding internal thread formed within said bore of said housing, said member having at least one portion thereof projecting interiorly of said housing and acting therein against one of said clutches, and said member further having at least another portion thereof projecting exteriorly of said housing for manual actuation by the operator, means to prevent said member from being withdrawn from said housing, means to axially advance said member at selected times along said internal thread of said bore to retract said member into said housing and axially move said one clutch into operative engagement with the other of said clutches against the force of said resilient means, and means to maintain said member rigidly in its selected position with respect to said housing.

2. That improvement as defined in claim 1, wherein said axially-movable member comprises a coaxial sleeve that encompasses and provides an outer radial bearing support for said driven clutch and is adapted to seat and act against said driven clutch interiorly of said housing.

3. In a combination power-driven drill and screwdriver of the character described, having a housing and having a pair of clutches within said housing for coupling the driving means to the driven means and further having a clutch spring tending to maintain said clutches in disengagement, that improvement in alternately overcoming and releasing the tension of said clutch spring, as desired, for alternately engaging and disengaging said clutches for alternate drilling and screwdriving operations, respectively, comprising, an axially-movable spindle bearing seated within a bore in said housing and comprising a coaxial sleeve encompassing and providing an outer radial bearing support for the spindle of the driven means, said spindle bearing having a portion of its outer cylindrical surface threaded to engage a corresponding inner thread formed within said bore of said housing, one portion of said spindle bearing projecting interiorly of said housing to seat and act against one of said clutches, and another portion of said spindle bearing projecting exteriorly of said housing and having a coaxial manually-manipulatable adjusting collar secured thereto, whereby said spindle bearing may be alternately advanced with respect to said housing to disengage said clutches or may be retracted within said housing against the tension of said clutch spring to engage said clutches for alternate screwdriving and drilling operations, respectively, means to limit the axial advance of said spindle bearing out of said housing, and means to maintain said spindle bearing rigidly on its selected position with respect to said housing.

4. That improvement as defined in claim 3, wherein only approximately one-half turn of said adjusting collar is necessary to lock said clutches into engagement.

5. That improvement as defined in claim 3, wherein said spindle of the driven means comprises a coaxial sleeve seated within said housing and having a lower clutch surface formed on its interiorly-projecting portion and further having means on its exteriorly projecting portion to couple a tool holding mechanism.

6. That improvement as defined in claim 3, wherein the means to limit the axial advance of said spindle bearing out of said housing comprises a coaxial stop collar secured to said spindle bearing interiorly of said housing and adapted to shoulder against the interior wall of said housing adjacent said bore.

7. That improvement as defined in claim 3, wherein the means to maintain said spindle bearing rigidly in its selected position with respect to said housing comprises at least one auxiliary bore in said housing radially disposed with respect to said bore in which said spindle bearing is seated, said auxiliary bore being located in a plane which encompasses said internal thread of said bore, a plug of relatively resilient material located within said auxiliary bore and adapted to engage an arcuate portion of said external thread of said spindle bearing, and means to constantly force said plug against said external thread so as to dampen the effect of inherent vibrational forces developed during the operation of said tool.

8. A combination portable electric drill and screwdriver, comprising, a housing, an electric motor within said housing and having an armature shaft associated therewith, a spindle journalled for rotation within said housing, a spindle gear secured to said spindle intermediate its ends thereof, intermediate gear means to mechanically couple said spindle gear to said armature shaft, an upper clutch formed on the forward face of said spindle gear, a floating axially-movable spindle sleeve mounted coaxially upon said spindle forwardly of said spindle gear and journalled for rotation within said housing with the forwardmost portion of said spindle sleeve protruding from the forward portion of said housing, means to couple a tool-bit holding mechanism to said forwardmost portion of said spindle sleeve, a lower clutch formed on the rearmost face of said spindle sleeve, a clutch spring exerting a forward axial thrust upon said spindle sleeve to normally maintain said clutches in disengagement, means to axially slide said spindle sleeve rearwardly along said spindle and into said housing to lock said clutches into operative engagement against the tension of said clutch spring, means to limit the forward movement of said spindle sleeve out of said housing, and means to maintain said spindle sleeve rigidly in its adjusted position with respect to said housing.

9. A combination portable electric drill and screwdriver, comprising, a housing, an electric motor within said housing and having an armature shaft associated therewith, a spindle journalled within said housing, a spindle gear secured to said spindle intermediate its ends thereof, intermediate gear means to mechanically couple said spindle gear to said armature shaft, an upper clutch formed on the forwardmost face of said spindle gear, a coaxial spindle sleeve rotatably and slidably mounted on said spindle forwardly of said spindle gear, a lower clutch formed on the rearmost portion of said spindle sleeve, a coaxial annular recess formed between said clutches adjacent said spindle, a clutch spring confined in said recess and disposed around a portion of said spindle, the tension of said clutch spring tending to maintain said clutches in disengagement, said spindle sleeve protruding through an opening in said housing, a tool bit holding means coupled to the forwardmost portion of said spindle sleeve, an axially-movable spindle bearing comprising a coaxial sleeve rotatably and slidably mounted upon said spindle sleeve with the rearmost portion of said spindle bearing seating against the rearward portion of said spindle sleeve and adapted to act upon said spindle sleeve to move said lower clutch into operative engagement with said upper clutch against the tension of said clutch spring, said spindle bearing being seated within a bore in said housing and having a portion of its external cylindrical surface threaded to engage a corresponding internal thread formed within said bore, the forwardmost portion of said spindle bearing protruding externally from said housing, a manually-manipulatable adjusting collar secured to said forwardmost portion of said spindle bearing for advancing or retracting said spindle bearing with respect to said housing, a coaxial stop collar secured to said spindle bearing near said rearmost portion thereof interiorly of said housing and adapted to shoulder against the interior wall of said housing adjacent said bore to limit the forward advance of said spindle bearing out of said housing, the amount of axial travel of said spindle bearing corresponding to approximately one-half turn of said adjusting collar, whereby said spindle bearing may be alternately advanced or retracted with respect to said housing for alternately disengaging and engaging said clutches for alternate screwdriving and drilling operations, respectively, as desired, and means to maintain said spindle bearing rigidly in its adjusted position with respect to said housing, said latter means comprising, a plurality of auxiliary threaded bores in said housing radially disposed with respect to said spindle bearing and lying in a plane which encompasses the external thread formed on said spindle bearing, respective plugs of resilient material located within each of said bores and each adapted to engage an arcuate portion of said external thread of said spindle bearing, and respective set screws in each of said bores and each adapted to constantly force said respective plugs against said external thread of said spindle bearing, so as to dampen the effect of inherent vibrational forces developed during the operation of said tool.

References Cited in the file of this patent

UNITED STATES PATENTS

| | | |
|---|---|---|
| 1,699,870 | Black et al. | Jan. 22, 1929 |
| 2,857,997 | Graybill | Oct. 28, 1958 |

UNITED STATES PATENT OFFICE
CERTIFICATION OF CORRECTION

Patent No. 2,950,626                              August 30, 1960

Harold O. Short

It is hereby certified that error appears in the above numbered patent requiring correction and that the said Letters Patent should read as corrected below.

Column 1, line 38, for "close engagement" read -- disengagement --.

Signed and sealed this 3rd day of April 1962.

(SEAL)
Attest:

ERNEST W. SWIDER                           DAVID L. LADD
Attesting Officer                               Commissioner of Patents